A. B. Sprout.
Horse Rake.
No. 37,012.  Patented Nov. 25, 1862.
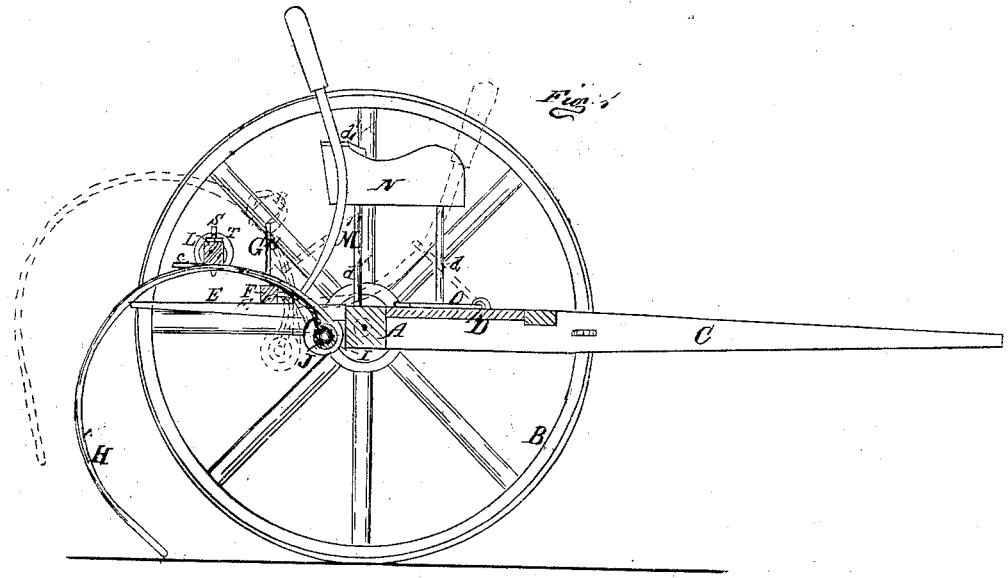
Witnesses:
J. W. Coombs
G. W. Reid
Inventor
A. B. Sprout
per Munn & Co.
Attorneys

UNITED STATES PATENT OFFICE.

A. B. SPROUT, OF HUGHESVILLE, PENNSYLVANIA.

IMPROVEMENT IN HORSE-RAKES.

Specification forming part of Letters Patent No. 37,012, dated November 25, 1862.

*To all whom it may concern:*

Be it known that I, A. B. SPROUT, of Hughesville, in the county of Lycoming and State of Pennsylvania, have invented a new and Improved Horse-Rake; and I do hereby declare that the following is a full, clear, and exact description of the same, reference being had to the accompanying drawings, making a part of this specification, in which—

Figure 1 is a side sectional view of my invention, taken in the line $xx$, Fig. 2. Fig. 2 is a plan or top view of the same.

Similar letters of reference indicate corresponding parts in the two figures.

This invention relates to a new and improved horse-rake of that class in which curved wire teeth are employed.

The object of the invention is to obtain a device of the class specified which will admit of the rake being operated with greater facility than those as previously arranged, and also discharge its load—that is to say, detach itself from the hay—more readily than the ordinary rakes.

To enable those skilled in the art to fully understand and construct my invention, I will proceed to describe it with reference to the drawings.

A represents an axle, having a wheel, B, placed loosely on each end of it, and C C are thills attached to the axle A, and having a platform, D, secured to their upper surfaces adjoining the axle A.

E represents bars, which project outward at right angles from the back of the axle A, and have a bar, F, attached to them by hinges or joints $a$. The bar F is parallel with the axle A, and the former has a series of metal loops or guides, G, attached to it, through which curved rake-teeth H pass. These teeth H are constructed of wire, as usual, and their upper or inner ends are attached to hubs or collars I, which are placed loosely on a shaft, J, the ends of the latter being connected to arms K K, attached to the bar F—one near each end and one at the center of the latter.

L is a bar, which is parallel with the bar F, and rests upon the teeth H, extending entirely across them, and, if necessary, provided with a weight, $b$, at each end. This bar L is connected by arms $c$ $c$ with the shaft J, the arms $c$ being fitted loosely on said shaft and passed through eyebolts S in the bar L, provided with clamp-nuts T, so that the said bar may be made to rest upon the teeth at any distance from the shaft, and thus hold them down with any required force to adapt the machine to work with light or heavy hay.

M is a lever, which is attached to the central arm, K, of the bar F, and extends upward at one side of the driver's seat N, which is supported by uprights $d$, attached to the platform D and axle A.

The operation is as follows: As the device is drawn along the bar L will keep the teeth H down to their work, so that they will rake up the hay before them, and when the rake is fully loaded the driver from his seat N throws forward the lever M, and thereby turns the bar F and raises the teeth H in a curved path backward and upward, so that they will be readily disengaged from the hay. This particular movement of the teeth is effected through the agency of the hinged bar F, which throws the fulcra of the teeth or the centers on which they turn some distance back of their inner or upper ends. The teeth H, it will be seen, are all raised simultaneously as the lever M is thrust forward. The rake is retained in an elevation when it is designed to be inoperative—as, for instance, in moving the machine from place to place—by securing the lever M down near the platform D by means of a hook, O, as shown in red in Fig. 1, and the bar F is prevented from turning on its joints or hinges when the rake is in a working position by means of a catch, $d$, attached to one side of the driver's seat N.

Having thus described my invention, what I claim as new, and desire to secure by Letters Patent, is—

1. Securing the teeth H in position by means of the fulcrum-bar F, connected by the arms K K to the shafts J, as herein shown and described.

2. Poising or balancing the teeth H, near the center of the same, upon a fulcrum-bar, F, hinged to the main frame in the rear of the shaft J and axle A, substantially as set forth, so as to adapt the teeth to be more readily raised by the lever M.

3. Securing the bar L adjustably upon the arms K, so that the said bar may be set in or out, in order to adapt the rake to work with light or heavy hay.

4. Providing the bar L with the removable weights $b$, substantially as and for the purposes set forth.

A. B. SPROUT.

Witnesses:
A. M. COWLES,
A. W. MUSGRAVE.